United States Patent
Yu et al.

(10) Patent No.: US 10,068,138 B2
(45) Date of Patent: Sep. 4, 2018

(54) DEVICES, SYSTEMS, AND METHODS FOR GENERATING A TEMPORAL-ADAPTIVE REPRESENTATION FOR VIDEO-EVENT CLASSIFICATION

(71) Applicant: CANON KABUSHIKI KAISHA, Tokyo (JP)

(72) Inventors: Jie Yu, Santa Clara, CA (US); Junjie Cai, San Jose, CA (US); Sandra Skaff, Mountain View, CA (US); Francisco Imai, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 15/189,996

(22) Filed: Jun. 22, 2016

(65) Prior Publication Data

US 2017/0083798 A1    Mar. 23, 2017

Related U.S. Application Data

(60) Provisional application No. 62/220,056, filed on Sep. 17, 2015.

(51) Int. Cl.
*G06K 9/00* (2006.01)
*G06F 17/30* (2006.01)

(52) U.S. Cl.
CPC .... *G06K 9/00751* (2013.01); *G06F 17/30784* (2013.01)

(58) Field of Classification Search
CPC ................................................ G06F 17/30784
See application file for complete search history.

(56) References Cited

U.S. PATENT DOCUMENTS

| | | | | |
|---|---|---|---|---|
| 6,052,481 A | * | 4/2000 | Grajski | G06K 9/222 382/187 |
| 9,262,698 B1 | * | 2/2016 | George | G06N 3/08 |
| 2008/0025394 A1 | | 1/2008 | Francois | |
| 2013/0156304 A1 | * | 6/2013 | Moorty | G06K 9/00711 382/159 |
| 2014/0169623 A1 | | 6/2014 | Liu | |
| 2017/0220864 A1 | * | 8/2017 | Li | G06K 9/00604 382/117 |

OTHER PUBLICATIONS

Dan Oneata et al., The LEAR submission at Thumos 2014, Sep. 2014.

(Continued)

*Primary Examiner* — Oneal R Mistry
(74) *Attorney, Agent, or Firm* — Canon U.S.A., Inc. IP Division

(57) ABSTRACT

Devices, systems, and methods for computer recognition of action in video obtain frame-level feature sets of visual features that were extracted from respective frames of a video, wherein the respective frame-level feature set of a frame includes the respective visual features that were extracted from the frame; generate first-level feature sets, wherein each first-level feature set is generated by pooling the visual features from two or more frame-level feature sets, and wherein each first-level feature set includes pooled features; and generate second-level feature sets, wherein each second-level feature set is generated by pooling the pooled features in two or more first-level feature sets, wherein each second-level feature set includes pooled features.

15 Claims, 12 Drawing Sheets

(56) References Cited

OTHER PUBLICATIONS

Xiaojiang Peng et al., Bag of Visual Words and Fusion Methods for Action Recognition: Comprehensive Study and Good Practice, May 2014.
Olga Russakovsky et al., ImageNet Large Scale Visual Recognition Challenge, Jan. 2015.
Sreemanananth Sadanand et al., Action Bank: A High-Level Representation of Activity in Video, May 2012.
Jorge Sanchez et al., Image Classication with the Fisher Vector: Theory and Practice, Jun. 2013.
Karen Simonyan et al., Two-Stream Convolutional Networks for Action Recognition in Videos, Jun. 2014.
Khurram Soomro et al., UCF101: A Dataset of 101 Human Actions Classes From Videos in The Wild, Nov. 2012.
THUMOS Challenge 2015, Jun. 2015, downloaded on Sep. 9, 2016.
Andrea Vedaldi et al., VLFeat—An open and portable library of computer vision algorithms, Oct. 2010.
Limin Wang et al., Action Recognition with Trajectory-Pooled Deep-Convolutional Descriptors, CVPR 2015, Jun. 2015.
Heng Wang et al., Action Recognition with Improved Trajectories, ICCV 2013—IEEE International Conference on Computer Vision, Dec. 2013.
Jianxin Wu et al., Towards Good Practices for Action Video Encoding, CVPR 2014, Jun. 2014.
Zhongwen Xu et al., A Discriminative CNN Video Representation for Event Detection, Nov. 2014.
Bangpeng Yao et al., Human Action Recognition by Learning Bases of Action Attributes and Parts, Nov. 2011.
Y-Lan Boureau et al., A Theoretical Analysis of Feature Pooling in Visual Recognition, Proceedings of the 27th International Conference on Machine Learning, Jun. 2010.
Jaesik Choi et al., Spatio-temporal pyramid matching for sports videos, Oct. 2008.
Jaesik Choi et al., A Spatio-Temporal Pyramid Matching for Video Retrieval, Jun. 2013.
Yong Du et al., Hierarchical Recurrent Neural Network for Skeleton Based Action Recognition, CVPR 2015, Jun. 2015.
Svetlana Lazebnik et al., Beyond bags of features: spatial pyramid matching for recognizing natural scene categories, IEEE Conference on Computer Vision & Pattern Recognition (CPRV '06), Jun. 2006.
Karen Simonyan et al., Very Deep Convolutional Networks for Large-Scale Image Recognition, Apr. 2015.
Yingwei Li et al., VLAD3: Encoding Dynamics of Deep Features for Action Recognition, Mar. 2016.
Peng Wang et al., Temporal Pyramid Pooling Based Convolutional Neural Network for Action Recognition, Apr. 2015.
Relja Arandjelovic et al., All about VLAD, Jun. 2013.
Alessandro Bergamo et al., Classemes and Other Classifier-based Features for Efficient Object Categorization, Mar. 2014.
Zhuowei Cai et al., Multi-View Super Vector for Action Recognition, CVPR 2014, Jun. 2014.
Jiawei Chen et al., Event-Driven Semantic Concept Discovery by Exploiting Weakly Tagged Internet Images, ICMR 2014, Apr. 2014.
Jia Deng et al., Scalable Multi-label Annotation, Apr. 2014.
Geoffrey Hinton et al., Deep Neural Networks for Acoustic Modeling in Speech Recognition, Oct. 2012.
Herve Jegou et al., Aggregating local descriptors into a compact image representation, Mar. 2010.
Yangqing Jia et al., Caffe: Convolutional Architecture for Fast Feature Embedding, Jun. 2014.
Andrej Karpathy et al., Large-scale Video Classification with Convolutional Neural Networks, CVPR 2014, Jun. 2014.
Alex Krizhevsky et al., ImageNet Classification with Deep Convolutional Neural Networks, Neural Information Processing Systems 2012, Dec. 2012.
Ivan Laptev, On Space-Time Interest Points, International Journal of Computer Vision 64(2/3), 107-123, Jun. 2005.
Ivan Laptev et al., Learning realistic human actions from movies, CVPR 2008, Jun. 2008.
Yann LeCun et al., Convolutional Networks and Applications in Vision, Feb. 2010.
Jingen Liu et al., Recognizing Human Actions by Attributes, CVPR 2011, Jun. 2011.

* cited by examiner

DEVICES, SYSTEMS, AND METHODS FOR GENERATING A TEMPORAL-ADAPTIVE REPRESENTATION FOR VIDEO-EVENT CLASSIFICATION

CROSS-REFERENCE TO RELATED APPLICATIONS

This application claims the benefit of U.S. Provisional Application No. 62/220,056, which was filed on Sep. 17, 2015.

BACKGROUND

Technical Field

This application generally relates to computer recognition of action in video.

Background

Computers are not able to accurately recognize action. An action includes a combination of visual elements (e.g., people, objects, and scenes) and motions, which are related to individual element movements and their interactions with each other.

SUMMARY

Some embodiments of a device comprise one or more computer-readable media and one or more processors that are coupled to the computer-readable media. The one or more processors are configured to cause the device to obtain frame-level feature sets of visual features that were extracted from respective frames of a video, wherein the respective frame-level feature set of a frame includes the respective visual features that were extracted from the frame; generate first-level feature sets, wherein each first-level feature set is generated by pooling the visual features from two or more frame-level feature sets, and wherein each first-level feature set includes pooled features; and generate second-level feature sets, wherein each second-level feature set is generated by pooling the pooled features in two or more first-level feature sets, wherein each second-level feature set includes pooled features.

Some embodiments of a method comprise obtaining frame-level feature sets of visual features that were extracted from respective frames of a video, wherein the respective frame-level feature set of each frame includes the respective visual features that were extracted from the frame; pooling the visual features from a first group of two or more frame-level feature sets, thereby generating a first first-level feature set, wherein the first first-level feature set includes pooled features; pooling the visual features from a second group of two or more frame-level feature sets, thereby generating a second first-level feature set, wherein the second first-level feature set includes pooled features, and wherein the second group of two or more frame-level feature sets includes a least one feature set that is not included in the first group of two or more frame-level feature sets; and pooling the pooled features in the first first-level feature set and the second first-level feature set, thereby generating a first second-level feature set, wherein the first second-level feature set includes pooled features.

Some embodiments of one or more computer-readable storage media store instructions that, when executed by one or more computing devices, cause the one or more computing devices to perform operations that comprise obtaining frame-level feature sets of visual features that were extracted from respective frames of a video, wherein the respective frame-level feature set of each frame includes the respective visual features that were extracted from the frame; and generating a temporal-pooling pyramid based on the frame-level feature sets.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
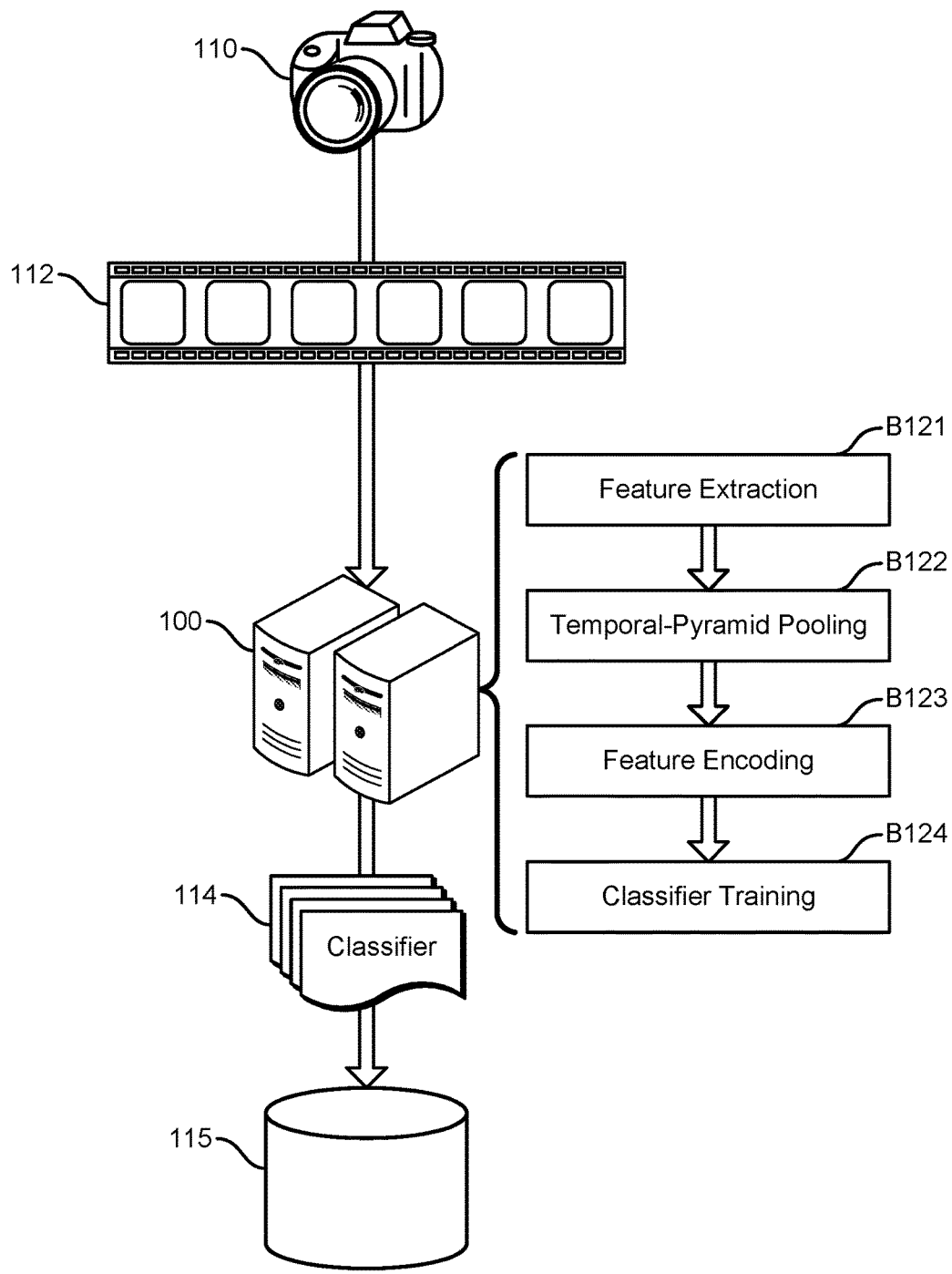
FIG. 1 illustrates the flow of operations in an example embodiment of a system for computer recognition of action in a video.

FIG. 1 illustrates the flow of operations in an example embodiment of a system for computer recognition of action in a video. The system includes one or more specially-configured computing devices 100. The computing devices 100 obtain training videos 112, which each include a respective plurality of frames, that were captured by a video camera 110. When in a training mode, after obtaining a video 112, the computing devices 100 perform the following operations.

First, in block B121, the computing devices 100 extract static visual features from the frames of the video 112. Some embodiments of the computing devices 100 use a deep neural network to extract the static visual features from each frame. For example, the deep neural network may include a convolutional neural network (e.g., a network pre-trained on the ImageNet large-scale image dataset), a deconvolutional neural network, or a recurrent neural network.

Figure 2:
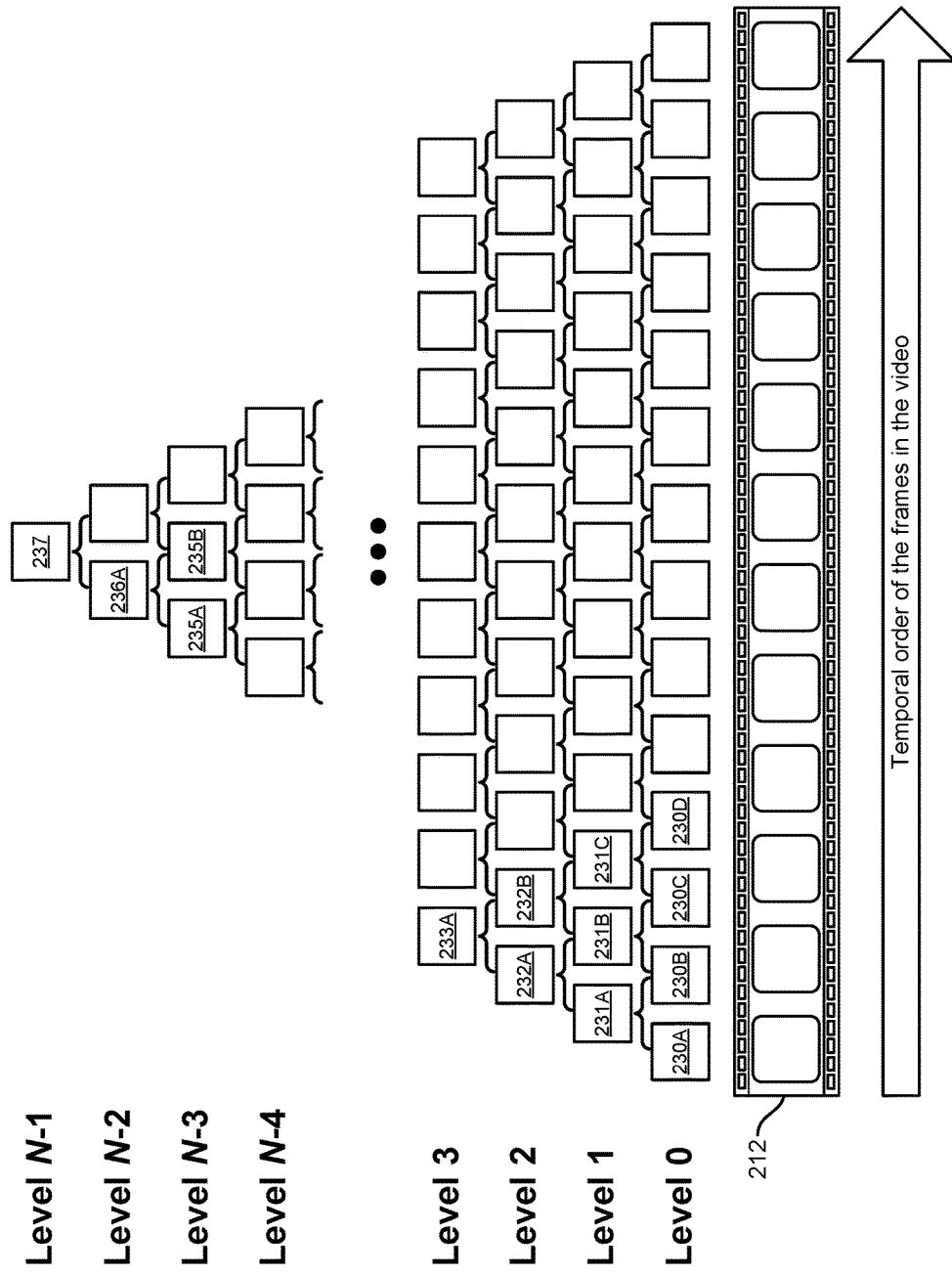
FIG. 2 illustrates an example embodiment of a temporal-pooling pyramid.

Next, in block B122, the computing devices 100 perform temporal-pyramid pooling on the extracted static visual features. The extracted static visual features from the frames are pooled at different temporal scales and levels. Thus, the computing devices 100 perform pooling at different scales in a temporal dimension. FIG. 2 illustrates an example embodiment of a temporal-pooling pyramid. The temporal-pooling pyramid includes multiple levels. In this example embodiment, level 0, which is the frame level, is composed of the features from each of the frames. Thus, for example, a first set of features (a first feature set) 230A includes the static visual features from one frame of a video 212, and a second feature set 230B includes the static visual features from another one of the frames of the video 212. The static visual features from adjacent frames in level 0 are pooled. For example, the static visual features of the first feature set 230A can be pooled with the static visual features of the second feature set 230B to generate a feature set 231A in level 1. The static visual features may be pooled by mean pooling, maximum pooling, or other pooling techniques.

Thus, in this embodiment, each feature set in level 1 (e.g., feature set 231A, feature set 231B) includes pooled features, which were generated by pooling static visual features from two feature sets in level 0. Likewise, the pooled features in the feature sets in each of the other levels that are higher than level 1 were generated by pooling the features from two feature sets in the level that is immediately below. For example, feature set 235A in level N−3 (where N is the number of levels) is pooled with feature set 235B to generate the pooled features that are in feature set 236A in level N−2.

Also, the temporal-pooling pyramid may maintain the temporal order of the feature sets. In FIG. 2, the temporal order proceeds from left to right. Thus, feature set 232B follows feature set 232A in the temporal order.

Moreover, a feature set in a level that is higher than level 0 includes pooled features that represent a temporal segment of the video that is the aggregate of the temporal segments of the underlying feature sets from level 0. For example, if the frame rate of the video is 1/48 frames per second, then feature set 233A includes pooled features that represent 1/12 second of the video, and feature set 232A includes pooled features that represent 1/16 second of the video.

Thus, once generated, the features sets in the temporal-pooling pyramid describe the frames of the video in multiple temporal scales. For example, if the frame rate of the video is 24 frames per second, then the level-0 feature sets describe the frames on a 1/24 second scale, the level-1 feature sets describe the frames on a 1/12 second scale, the level-2 feature sets describe the frames on a 1/8 second scale, and the level-3 feature sets describe the frames on a 1/6 second scale. Therefore, the feature sets of the temporal-pooling pyramid may collectively include pooled features that were generated from the entire video, pooled features that were generated from each half of the video, pooled features that were generated from each quarter of the video, etc. Also, if the highest level of the temporal-pooling pyramid includes only one feature set, the pooled features of that one feature set describe the video on a global scale.

Also, the pooled features in a feature set are based, either directly or indirectly, on the features from all the lower-level feature sets that descend from the feature set. For example, the pooled features in feature set 237 are based on all of the other feature sets in the temporal-pooling pyramid. Also for example, the pooled features in feature set 233A are directly based on the pooled features in feature set 232A and feature set 232B, and are indirectly based on the frame-level features in feature set 230A, feature set 230B, feature set 230C, and feature set 230D.

Additionally, in this embodiment, each feature set is pooled with both of the adjacent feature sets, although these poolings are separate. For example, the second feature set 230B in level 0 is pooled with the first feature set 230A in one pooling to produce feature set 231A and, in a separate pooling, is pooled with a third feature set 230C to produce feature set 231B. However, some embodiments may pool more than two feature sets to form a feature set of a higher level of the pyramid.

Finally, some embodiments of the temporal-pooling pyramid may not include level 0. Thus, some embodiments of the temporal-pooling pyramid include only pooled features.

Therefore, the temporal pooling pyramid includes a plurality of features sets, each of the feature sets includes one or more features, and at least some of the feature sets include one or more pooled features.

Referring again to FIG. 1, after generating the feature sets in the temporal-pooling pyramid, in block B123 the computing devices 100 encode the features in the feature sets from the temporal-pooling pyramid. For example, some embodiments use VLAD (vector of locally-aggregated descriptors) encoding or Fisher Vector encoding to encode the features.

Next, in block B124, the computing devices 100 train classifiers 114 (e.g., support vector machine (SVM) classifiers, AdaBoost classifiers, linear regression classifiers, random forest classifiers, a classification neural network) based on the encoded features and on training data (e.g., categorical information) that is included with the training videos 112. The classifiers 114 are then stored in a storage device 115. In some embodiments, the storage device 115 is part of one of the computing devices 100.

Figure 3:
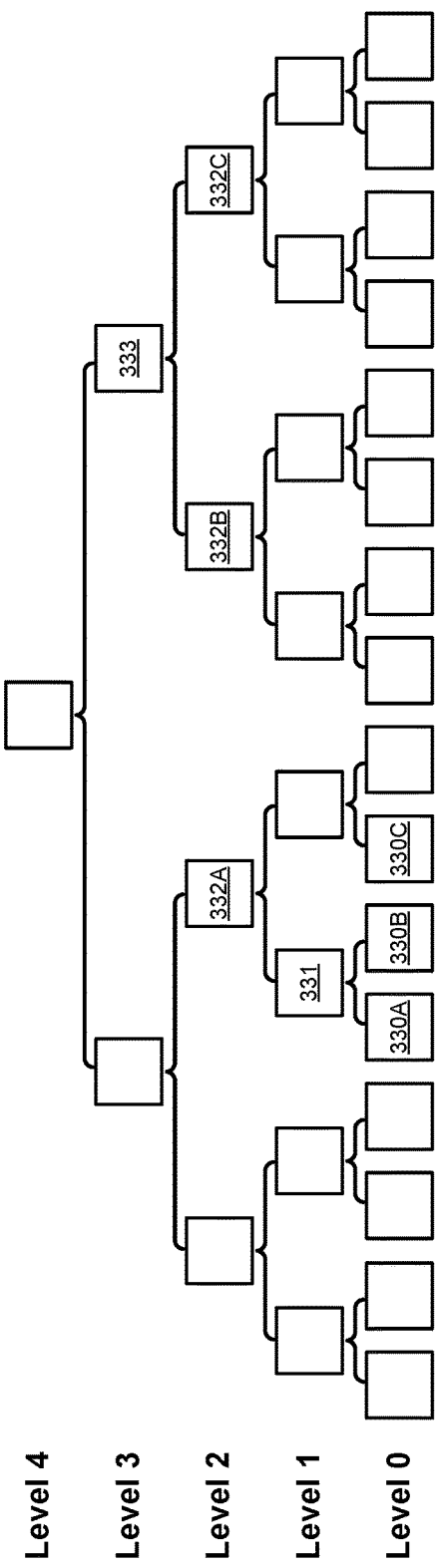
FIG. 3 illustrates an example embodiment of a temporal-pooling pyramid.

FIG. 3 illustrates an example embodiment of a temporal-pooling pyramid. In this embodiment, during the pooling each feature set is merged with only one adjacent feature set. For example, feature set 330B in level 0 is merged with feature set 330A during pooling, but is not merged with feature set 330C, even though feature set 330C is adjacent to feature set 330B in the temporal order. Also, feature set 332B in level 2 is merged with feature set 332C during pooling, but is not merged with feature set 332A, even though feature set 332A is adjacent to feature set 330B in the temporal order.

Figure 4:
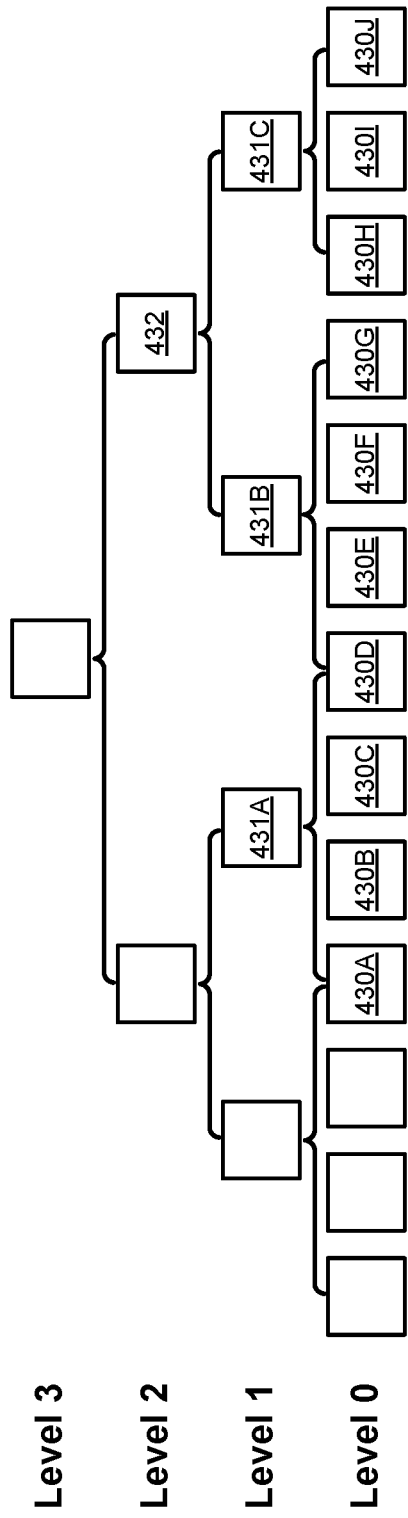
FIG. 4 illustrates an example embodiment of a temporal-pooling pyramid.

FIG. 4 illustrates an example embodiment of a temporal-pooling pyramid. In this embodiment, more than two feature sets in a level are pooled to create a higher-level feature set. Also, the number of pooled feature sets varies within a level and varies between levels. Furthermore, some feature sets are pooled with both adjacent feature sets in the temporal order, and some feature sets are pooled with only one adjacent feature set.

For example, in level 0, feature set 430A, feature set 430B, feature set 430C, and feature set 430D are pooled to generate feature set 431A in level 1. Also, feature set 430D is pooled with feature set 430E, feature set 430F, and feature set 430G to generate feature set 431B. This illustrates that more than two feature sets can be pooled to create a higher-level feature set, for example when computing resources are limited or when an action in the frames is slow moving relative to the frame rate.

Additionally, feature set 430D is pooled with both adjacent feature sets. However, feature set 430G is not pooled with feature set 430H, although feature set 430H is adjacent to feature set 430G in the temporal order. Furthermore, feature set 430H, feature set 430I, and feature set 430J are pooled to generate feature set 431C. Therefore, the feature sets in level 1 are not generated from the same number of pooled feature sets from level 0.

Furthermore, only two feature sets in level 1, feature set 431B and feature set 431C, are pooled to generate feature set 432 in level 2. Therefore, the number of pooled lower-level feature sets that compose a higher-level feature set can vary within a level and can vary between levels.

Figure 5:
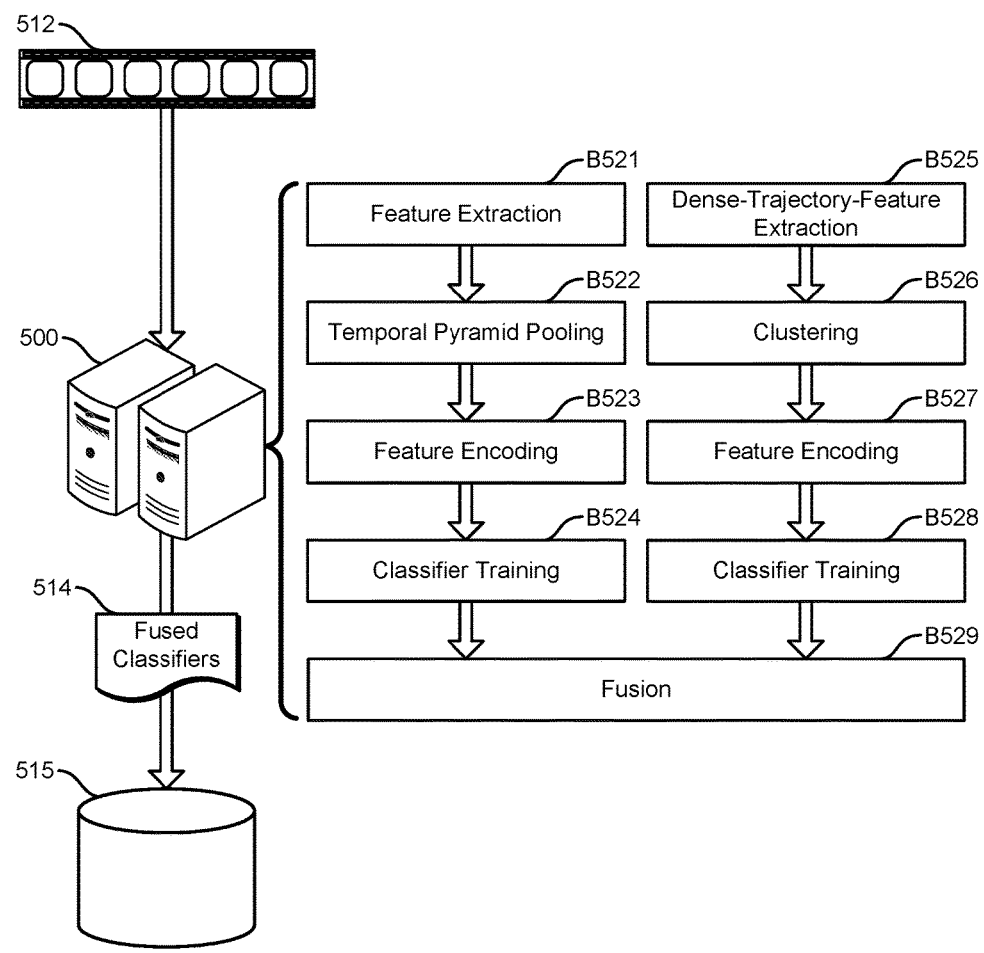
FIG. 5 illustrates the flow of operations in an example embodiment of a system for computer recognition of action in a video.

FIG. 5 illustrates the flow of operations in an example embodiment of a system for computer recognition of action in a video. The system includes one or more specially-configured computing devices 500. The computing devices 500 obtain training videos 512, each of which includes a respective plurality of frames. When in a training mode, after obtaining a training video 512, the computing devices 500 perform the following operations.

In block B521, the computing devices 500 extract static visual features from the frames of the video 512. A static visual feature is a visual feature that describes the visual information in only one frame, and thus a static visual feature does not depict a visual change from one frame to the next frame. Next, in block B522, the computing devices 500 perform temporal-pyramid pooling on the extracted static visual features. Then, in block B523 the computing devices 500 encode the static visual features (e.g., pooled features) that are in the feature sets of the temporal-pooling pyramid. In block B524, the computing devices 500 train classifiers based on the encoded features that are in the feature sets of the temporal-pooling pyramid and on training data that is included with the training videos 512.

Also, in block B525, the computing devices 500 perform dense-trajectory-feature extraction on the frames of the video 512 to extract dynamic dense-trajectory features or other trajectory features, such as Kanade-Lucas-Tomasi (KLT) trajectories and scale-invariant feature transform (SIFT) trajectories. A trajectory feature depicts visual changes in consecutive frames or describes the change or the movement of a point of interest across multiple frames.

Video data exhibits different views of visual patterns, such as appearance changes and motions with different boundaries. Therefore, referring not only to trajectory features, multiple features may be extracted from video data, and each feature can describe an aspect of the visual data. Histogram of oriented gradients (HOG) features, histogram of optical flow (HOF) features, and motion boundary histograms (MBH) features are examples of such features. These features may be represented with a bag-of-words (BoW) model, which may be computed in local cuboids obtained around detected spatial-temporal interest points or with dense-sampling schemes.

The different types of trajectory features can be computed in a spatial-temporal volume (e.g., a spatial size of 2×2 with a temporal length of 15 frames) around the three-dimensional (3D) neighborhoods of the tracked points along a trajectory. Each trajectory may be described by a concatenation of HOG, HOF, and MBH features, forming a 396-dimensional vector (96+108+96+96) in some embodiments.

In block B526, which is not included in some embodiments, the computing devices 500 cluster the dense-trajectory features. Then, in block B527, the computing devices 500 encode the dense-trajectory features, which are encoded in embodiments that include block B527. For example, some embodiments apply a Fisher Vector high-dimensional encoding scheme to each trajectory feature, and normalize the resulting super vectors using intra-power normalization. The normalization may be carried out in a block-by-block manner, and each block represents the vector related to one code word. For example, in some embodiments of the computing devices 500, the normalization can be described according to $p^k = \|p^k\|$, where $p^k$ denotes a vector related to a k-th Gaussian, where $\|.\|$ stands for $l_2$-norm, and where $k \in [1,K]$. Finally the normalized super vectors are concatenated to represent the motion information for a given video.

In block B528, the computing devices 500 train classifiers based on the encoded dense-trajectory features (or other trajectory features) and on training data that is included with the training videos 512.

Finally, in block B529, the computing devices 500 fuse the classifiers that are based on the encoded features in the feature sets of the temporal-pooling pyramid and the classifiers that are based on the dense-trajectory features to generate fused classifiers 514. The fused classifiers 514 are then stored in a storage device 515. In some embodiments, the storage device 515 is part of one of the computing devices 500.

However, some embodiments of the computing devices 500 perform fusion earlier. For example, some embodiments fuse the features in the feature sets of the temporal-pooling pyramid with the dense-trajectory features prior to feature encoding, and some embodiments fuse the encoded features in the feature sets of the temporal-pooling pyramid and the dense-trajectory features prior to classifier training.

Figure 6:
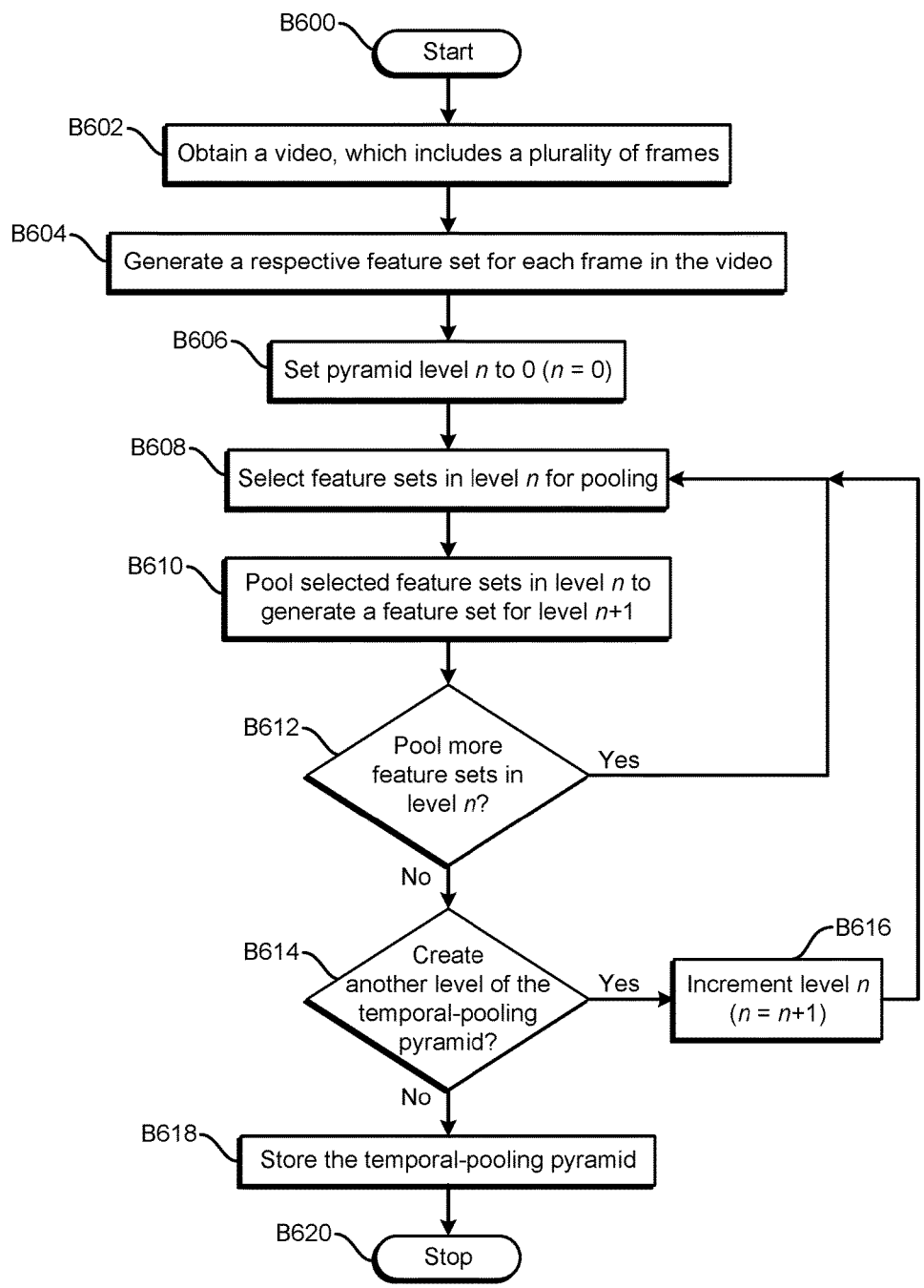
FIG. 6 illustrates an example embodiment of an operational flow for generating a temporal-pooling pyramid.

FIG. 6 illustrates an example embodiment of an operational flow for generating a temporal-pooling pyramid. The blocks of this operational flow and the other operational flows that are described herein may be performed by one or more specially-configured devices, for example the devices and systems that are described herein. Also, although the operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Figure 7:
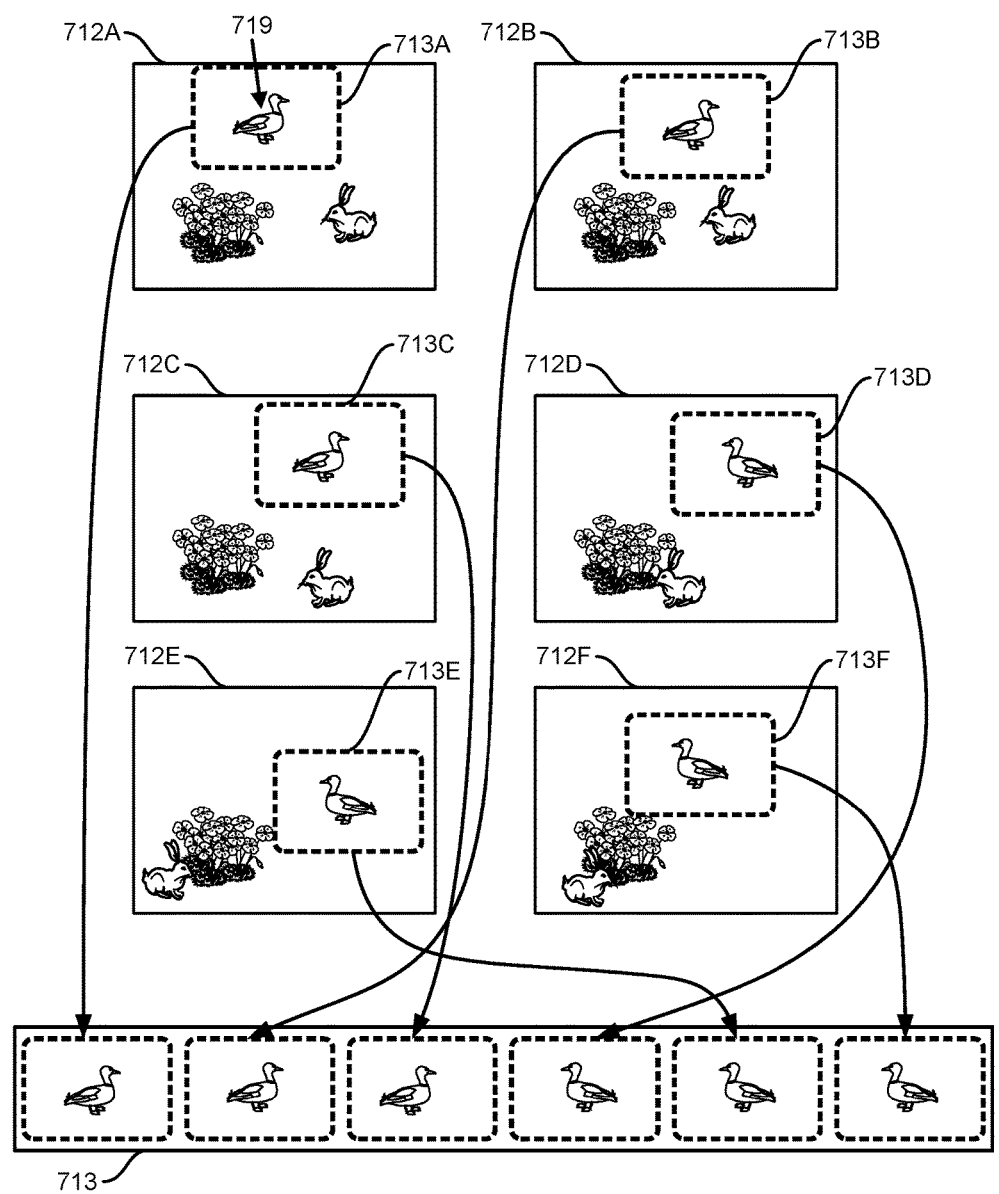
FIG. 7 illustrates an example embodiment of video frames that have been edited to track an object.

The flow starts in block B600, and then moves to block B602 where a video, which includes a plurality of frames, is obtained. In some embodiments, preprocessing is also done on the video to track an object in the video and to remove other objects from the frames of the video, for example as shown in FIG. 7. The flow then moves to block B604, where a respective feature set is generated for each frame in the video. For example, the static visual features in the feature sets may be extracted by a neural network, may be SIFT features, or may be HOG features. Each feature set includes the static visual features from a respective frame of the video.

Next, in block B606, the pyramid level is set to 0 (n=0). The flow then moves to block B608, where features sets in level n are selected for pooling. In some embodiments, for example the embodiment shown in FIG. 2, in which each feature set (other than the first and last feature sets in the temporal order) is pooled with both temporally-adjacent feature sets, the next feature set that has not been pooled with the previous feature set in the temporal order is selected, along with the previous feature set. However, in some embodiments (e.g., the embodiment in FIG. 3, the embodiment in FIG. 4), another criterion is used to select the feature sets for pooling.

The flow then proceeds to block B610, where the selected feature sets in level n are pooled, thereby generating a feature set for level n+1. The flow then moves to block B612, where it is determined (by the device that performs the operation) if more feature sets in level n are to be pooled. If yes, then the flow returns to block B608. If not, then the flow moves to block B614, where it is determined (by the device that performs the operation) if another level of the temporal-pooling pyramid is to be created. If yes, then the flow moves to block B616, where level n is incremented (n=n+1), and then the flow returns to block B608. If not (e.g., if level n+1 has only one feature set), then the flow moves to block B618, where the temporal-pooling pyramid is stored on one or more computer-readable media. Then the flow ends in block B620.

FIG. 7 illustrates an example embodiment of video frames that have been edited to track an object. A first sub-frame 713A, which includes a tracked object 719, is cut from a first frame 712A of a video. Likewise, a second sub-frame 713B is cut from a second frame 712B of the video, a third sub-frame 713C is cut from a third frame 712C of the video, a fourth sub-frame 713D is cut from a fourth frame 712D of the video, a fifth sub-frame 713E is cut from a fifth frame 712E of the video, and a sixth sub-frame 713F is cut from a sixth frame 712F of the video. The sub-frames 713A-F are then assembled to form a new video 713. The new video 713 thus has a smaller view than the original video.

Figure 8:
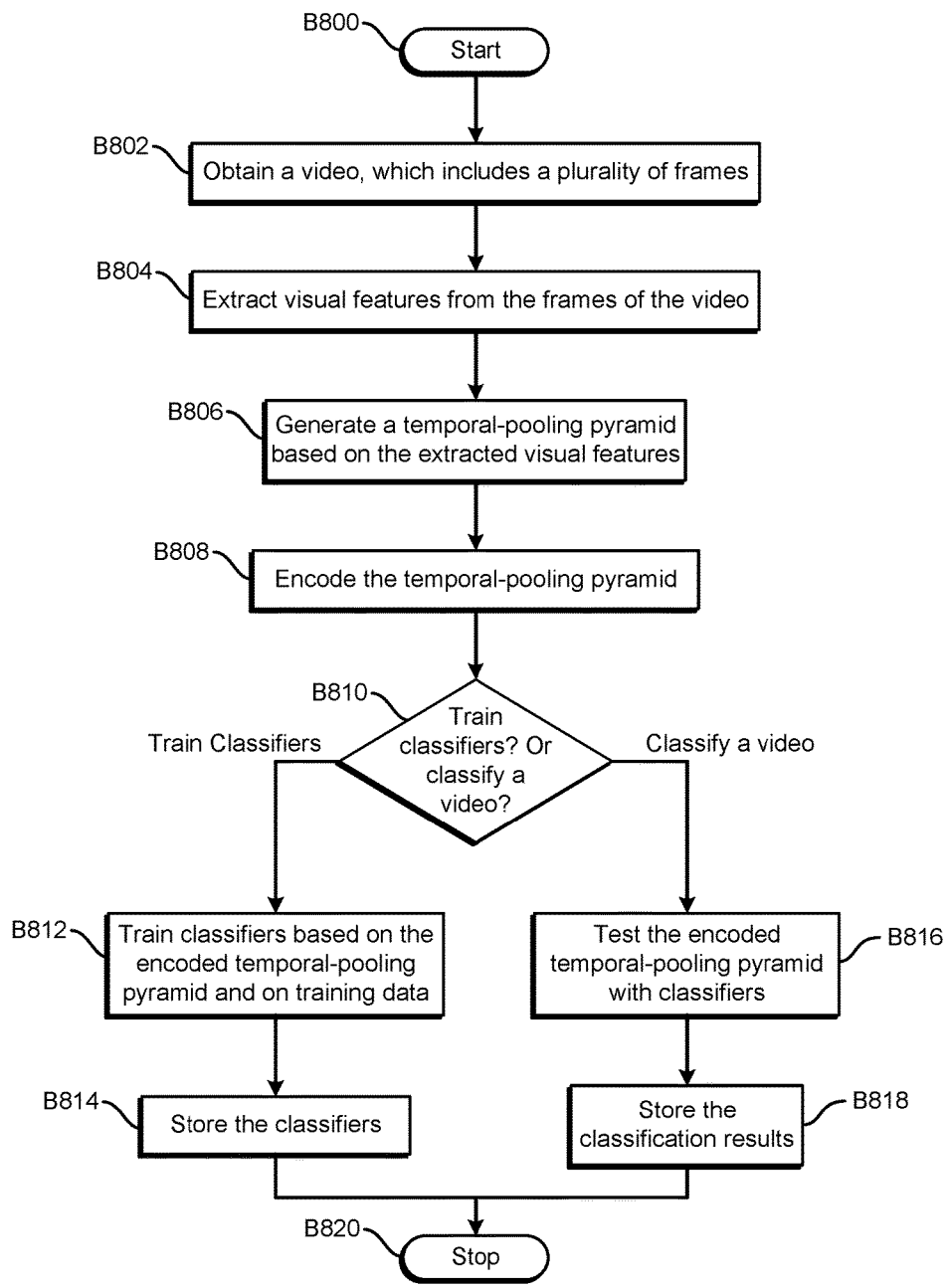
FIG. 8 illustrates an example embodiment of an operational flow for computer recognition of action in videos.

FIG. 8 illustrates an example embodiment of an operational flow for computer recognition of action in videos. The flow begins in block B800, and then proceeds to block B802, where a video, which includes a plurality of frames, is obtained. Next, in block B804, visual features are extracted from each of the frames in the video, thereby generating a feature set for each frame. The flow then moves to block B806, where temporal-pyramid pooling is performed on the visual features in the feature sets of the video, thereby generating a temporal-pooling pyramid based on the extracted features. Next, in block B808, the temporal-pooling pyramid is encoded.

The flow proceeds to block B810, where it is determined if classifiers are to be trained (e.g., in a training mode) or, alternatively, if the video is to be classified (e.g., in a testing mode). If classifiers are to be trained, then the flow moves to block B812, where classifiers are trained based on the encoded temporal-pooling pyramid and on training data. In block B814, the classifiers are stored, and then the flow ends in block B820.

However, if in block B810 it is determined that the video is to be classified, then the flow moves to block B816, where the encoded temporal-pooling pyramid is tested with previously-trained classifiers. Next, in block B818, the classification results are stored, and then flow ends in block B820.

Figure 9:
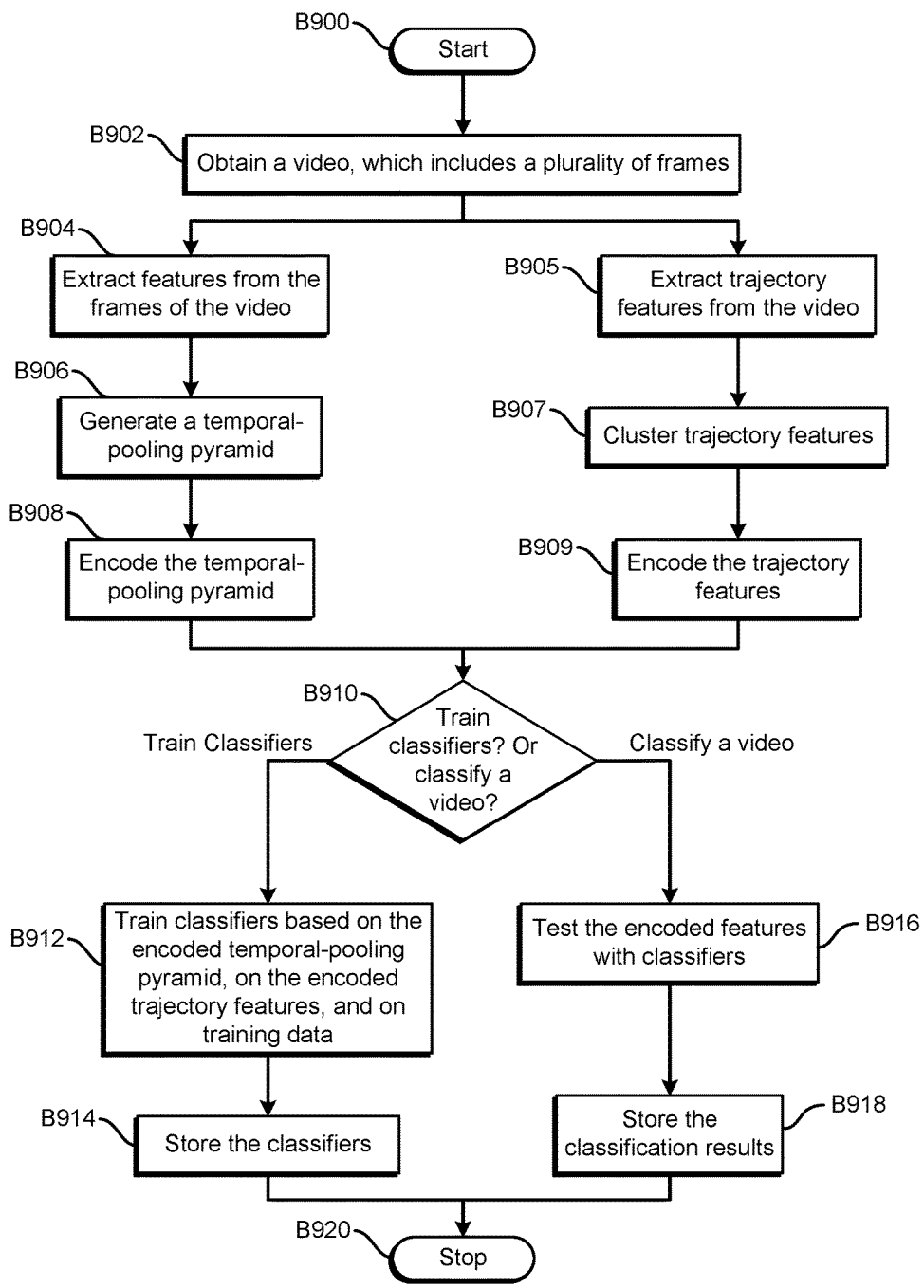
FIG. 9 illustrates an example embodiment of an operational flow for computer recognition of action in videos.

FIG. 9 illustrates an example embodiment of an operational flow for computer recognition of action in videos. The flow starts in block B900 and then advances to block B902, where a video, which includes a plurality of frames, is obtained. The flow then splits into a first flow and a second flow.

The first flow moves to block B904, where visual features are extracted from the frames of the video, and to block B906, where a temporal-pooling pyramid is generated based on the visual features that were extracted in block B904. Next, in block B908, the temporal-pooling pyramid is encoded, and then the first flow moves to block B910.

The second flow moves to block B905, where trajectory features (e.g., dense-trajectory features) are extracted from the video. In block B907, which is not included in some embodiments, the trajectory features are clustered, for example using Gaussian Mixture Model (GMM) clustering. The flow then moves to block B909, where the trajectory features, which are clustered in embodiments that include block B907, are encoded. The second flow then proceeds to block B910.

Furthermore, in some embodiments, the temporal-pooling pyramid is fused with the trajectory features before encoding.

In block B910, it is determined if classifiers are to be trained or, alternatively, if the video is to be classified. If classifiers are to be trained, then the flow moves to block B912. In block B912, classifiers are trained based on the encoded temporal-pooling pyramid, on the encoded trajectory features, and on training data. In some embodiments, the encoded temporal-pooling pyramid and the encoded trajectory features are fused before the classifiers are trained, and in some embodiments the classifiers are separately trained for the encoded temporal-pooling pyramid and the encoded trajectory features, and then the classifiers are fused. The flow then moves to block B914, where the classifiers are stored, and then to block B920, where the flow ends.

If in block B910 the video is to be classified, then the flow moves to block B916, where the encoded features, which include the encoded temporal-pooling pyramid and the encoded trajectory features, are tested with previously-trained classifiers. Next, in block B918, the classification results are stored, and the flow ends in block B920.

Figure 10:
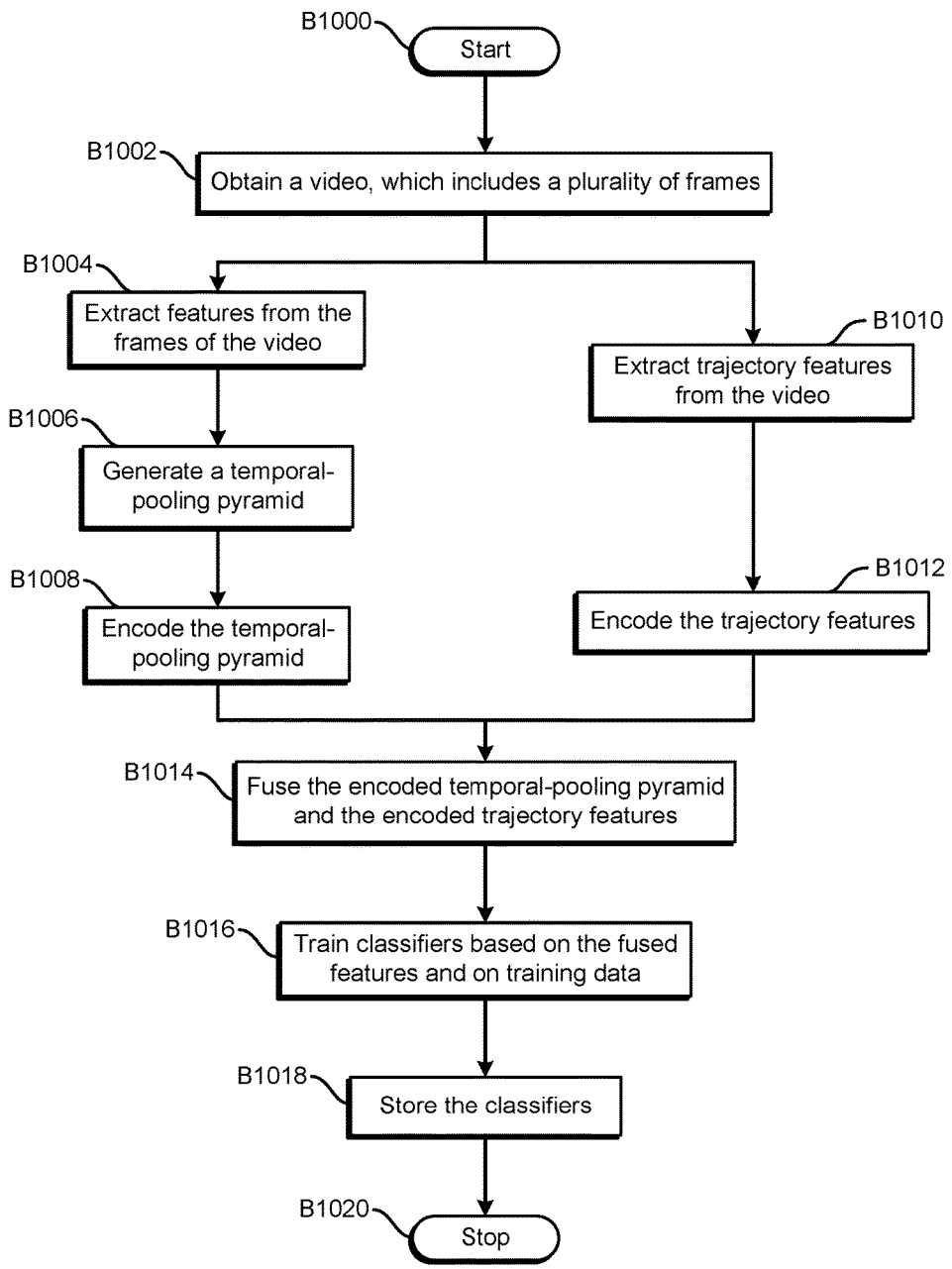
FIG. 10 illustrates an example embodiment of an operational flow for computer recognition of action in videos.

FIG. 10 illustrates an example embodiment of an operational flow for computer recognition of action in videos. The flow starts in block B1000 and then moves to block B1002, where a video, which includes a plurality of frames, is obtained. The flow then splits into a first flow and a second flow.

The first flow proceeds to block B1004, where visual features are extracted from the frames of the video. Next, in block B1006, a temporal-pooling pyramid is generated based on the extracted visual features. The first flow then moves to block B1008, where the temporal-pooling pyramid is encoded, and then the first flow proceeds to block B1014.

From block B1002, the second flow moves to block B1010, where trajectory features are extracted from the video. The second flow then proceeds to block B1012, where the trajectory features are encoded, and then to block B1014. This example embodiment does not cluster the trajectory features.

In block B1014, the features in the encoded temporal-pooling pyramid and the encoded trajectory features are fused. The flow then moves to block B1016, where classifiers are trained based on the fused features and on training data that was included with the video. Finally, the classifiers are stored in block B1018, and then the flow ends in block B1020.

Figure 11:
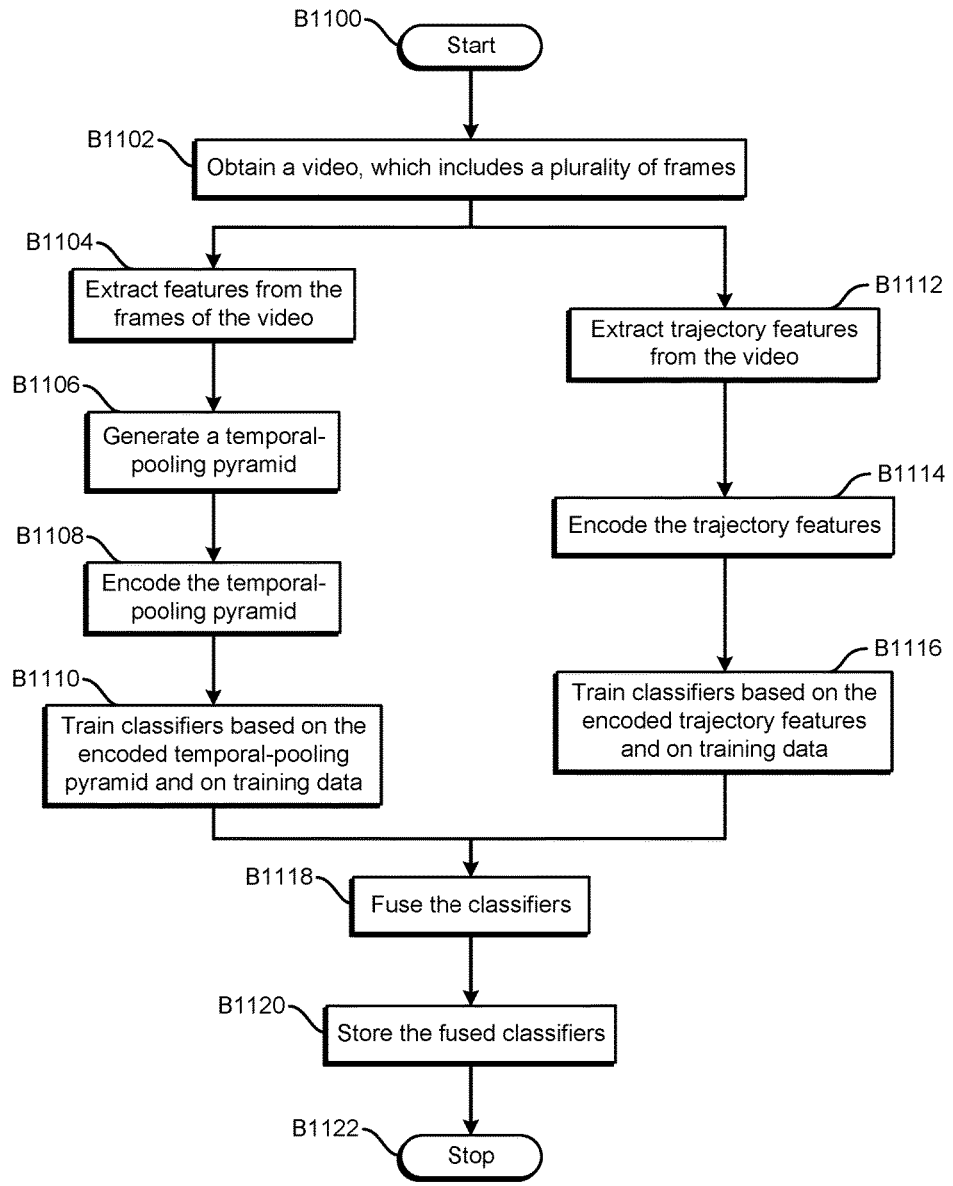
FIG. 11 illustrates an example embodiment of an operational flow for computer recognition of action in videos.

FIG. 11 illustrates an example embodiment of an operational flow for computer recognition of action in videos. The flow starts in block B1100 and then moves to block B1102, where a video, which includes a plurality of frames, is obtained. The flow then splits into a first flow and a second flow.

The first flow proceeds to block B1104, where features are extracted from the frames of the video. Next, in block B1106, a temporal-pooling pyramid is generated based on the extracted features. The first flow then moves to block B1108, where the temporal-pooling pyramid is encoded, and then to block B1110, where classifiers are trained based on the encoded temporal-pooling pyramid and on training data. The first flow then proceeds to block B1118.

From block B1102, the second flow moves to block B1112, where trajectory features are extracted from the video. The second flow then proceeds to block B1114, where the trajectory features are encoded, and then to block B1116, where classifiers are trained based on the encoded trajectory features and on the training data. The second flow then moves to block B1118.

In block B1118, the classifiers are fused. The flow then moves to block B1120, where the fused classifiers are stored. Finally, the flow ends in block B1122.

Figure 12:
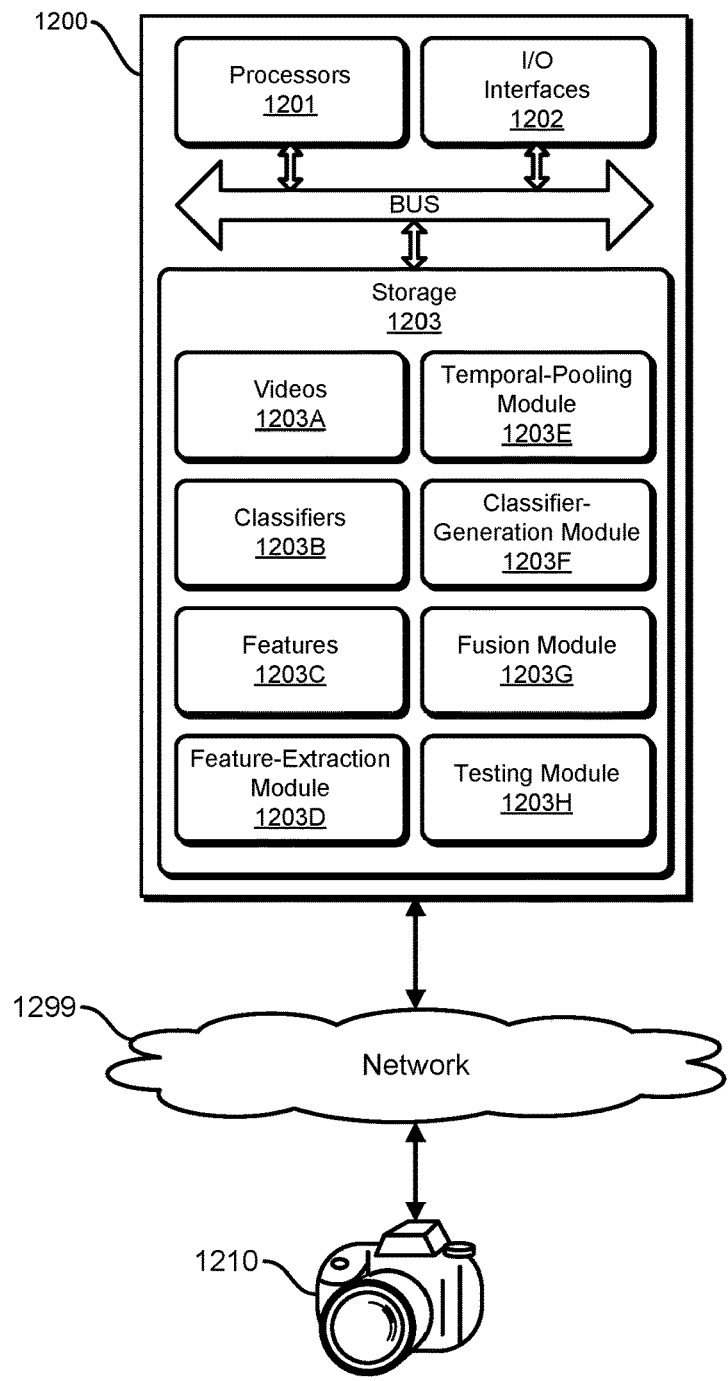
FIG. 12 illustrates an example embodiment of a system for computer action recognition.

FIG. 12 illustrates an example embodiment of a system for computer action recognition. The system includes an action-recognition device 1200, which is a specially-configured computing device, and a camera 1210. Some embodiments include additional action-recognition devices. In this embodiment, the devices communicate by means of one or more networks 1299, which may include a wired network, a wireless network, a LAN, a WAN, a MAN, and a PAN. Also, in some embodiments the devices communicate by means of other wired or wireless channels (e.g., a USB cable, a direct WiFi connection).

The action-recognition device 1200 includes one or more processors 1201, one or more I/O interfaces 1202, and storage 1203. Also, the hardware components of the action-recognition device 1200 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1201 include one or more central processing units (CPUs), which include microprocessors (e.g., a single core microprocessor, a multi-core microprocessor), or other electronic circuitry. The one or more processors 1201 are configured to read and perform computer-executable instructions, such as instructions that are stored in the storage 1203. The I/O interfaces 1202 include communication interfaces to input and output devices, which may include a keyboard, a display device, a mouse, a printing device, a touch screen, a light pen, an optical-storage device, a scanner, a microphone, a camera, a drive, a controller (e.g., a joystick, a control pad), and a network interface controller.

The storage 1203 includes one or more computer-readable storage media. A computer-readable storage medium, in contrast to a mere transitory, propagating signal per se, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1203, which may include both ROM and RAM, can store computer-readable data or computer-executable instructions. In this embodiment, the storage 1203 stores videos 1203A, classifiers 1203B, and features 1203C (e.g., trajectory features, temporal-pooling pyramids).

The action-recognition device 1200 also includes a feature-extraction module 1203D, a temporal-pooling module 1203E, a classifier-generation module 1203F, a fusion module 1203G, and a testing module 1203H. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules include software, the software can be stored in the storage 1203.

The feature-extraction module 1203D includes instructions that, when executed, or circuits that, when activated, cause the action-recognition device 1200 to extract visual features from videos, for example as performed in block B121 in FIG. 1, blocks B521 and B525 in FIG. 5, block B604 in FIG. 6, block B804 in FIG. 8, blocks B904 and B905 in FIG. 9, blocks B1004 and B1010 in FIG. 10, and blocks B1104 and B1112 in FIG. 11.

The temporal-pooling module 1203E includes instructions that, when executed, or circuits that, when activated, cause the action-recognition device 1200 to perform temporal-pyramid pooling, thereby creating a temporal-pooling pyramid, for example as performed in block B122 in FIG. 1, block B522 in FIG. 5, blocks B606-B618 in FIG. 6, block B806 in FIG. 8, block B906 in FIG. 9, block B1006 in FIG. 10, and block B1106 in FIG. 11.

The classifier-generation module 1203F includes instructions that, when executed, or circuits that, when activated, cause the action-recognition device 1200 to generate one or more classifiers based on a temporal-pooling pyramid and, in some embodiments, on trajectory features, for example as performed in block B124 in FIG. 1, blocks B524 and B528 in FIG. 5, blocks B812-B814 in FIG. 8, blocks B912-B914 in FIG. 9, block B1016 in FIG. 10, and blocks B1110 and B1116 in FIG. 11.

The fusion module 1203G includes instructions that, when executed, or circuits that, when activated, cause the action-recognition device 1200 to fuse features or classifiers, for example as described in block B529 in FIG. 5, block B1014 in FIG. 10, and block B1118 in FIG. 11.

The testing module 1203H includes instructions that, when executed, or circuits that, when activated, cause the action-recognition device 1200 to classify a video based on trained classifiers. In some embodiments, the testing module 1203H calls one or more of the feature-extraction module 1203D, the temporal-pooling module 1203E, the classifier-generation module 1203F, and the fusion module 1203G.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:
1. A device comprising:
one or more computer-readable media; and
one or more processors that are coupled to the computer-readable media and that are configured to cause the device to
obtain frame-level feature sets of visual features that were extracted from respective frames of a video, wherein the respective frame-level feature set of a frame includes the respective visual features that were extracted from the frame,
generate first-pooled-level feature sets, wherein each first-pooled-level feature set is generated by pooling the visual features from two or more frame-level feature sets, wherein each first-pooled-level feature set includes pooled features, and wherein a pooled feature in the first-pooled-level feature sets is generated by pooling two or more visual features, generate second-pooled-level feature sets, wherein each second-pooled-level feature set is generated by pooling the pooled features in two or more first-pooled-level feature sets, wherein each second-pooled-level feature set includes pooled features, and wherein a pooled feature in the second-pooled-level feature sets is generated by pooling two or more pooled features in the first-pooled-level feature sets, obtain trajectory features that were extracted from the video;

fuse the trajectory features with at least some of the pooled features in the first-pooled-level feature sets and the pooled features in the second-pooled-level feature sets, thereby generating fused features;

train classifiers based on the fused features;

obtain a test video; and classify the test video using the trained classifiers.

2. The device of claim 1, wherein the frames of the video are arranged in a temporal order, and wherein the frame-level feature sets, the first-pooled-level feature sets, and the second-pooled-level feature sets maintain the temporal order.

3. The device of claim 2, wherein pooling the visual features from two or more frame-level feature sets includes pooling the respective frame-level feature sets of frames that are adjacent to each other in the temporal order.

4. The device of claim 1, wherein each first-pooled-level feature set is generated by pooling the visual features from only two frame-level feature sets.

5. The device of claim 1, wherein each first-pooled-level feature set is generated by pooling the visual features from three or more frame-level feature sets.

6. The device of claim 1, wherein the one or more processors are further configured to cause the device to generate third-pooled-level feature sets, wherein each third-pooled-level feature set is generated by pooling the pooled features in two or more second-pooled-level feature sets, wherein each third-pooled-level feature sets includes pooled features.

7. The device of claim 1, wherein the first-pooled-level feature sets describe the frames of the video in a first temporal scale, the second-pooled-level feature sets describe the frames of the video in a second temporal scale, and the first temporal scale is different from the second temporal scale.

8. The device of claim 7, where the frame-level feature sets describe the frames of the video in a third temporal scale that is different from both the first temporal scale and the second temporal scale.

9. The device of claim 1, wherein the pooling of two or more visual features uses minimum pooling, maximum pooling, or average pooling.

10. A method comprising:

obtaining frame-level feature sets of visual features that were extracted from respective frames of a video, wherein the respective frame-level feature set of each frame includes the respective visual features that were extracted from the frame;

pooling the visual features from a first group of two or more frame-level feature sets, thereby generating a first first-level feature set, wherein the first first-level feature set includes pooled features, and wherein at least some of the pooled features in the first first-level feature set were each generated by pooling two or more respective visual features;

pooling the visual features from a second group of two or more frame-level feature sets, thereby generating a second first-level feature set, wherein the second first-level feature set includes pooled features, wherein the second group of two or more frame-level feature sets includes a least one feature set that is not included in the first group of two or more frame-level feature sets, and wherein at least some of the pooled features in the second first-level feature set were each generated by pooling two or more respective visual features;

pooling the pooled features in the first first-level feature set and the second first-level feature set, thereby generating a first second-level feature set, wherein the first second-level feature set includes pooled features that were pooled from the pooled features in first first-level feature set and from the pooled features in the second first-level feature set, and wherein at least some of the pooled features in the first second-level feature set were each generated by pooling at least one respective pooled feature in the first first-level feature set with at least one respective pooled feature in the second first-level feature set;

training first classifiers based on one or more of the pooled features in the first first-level feature set, on the pooled features in the second first-level feature set, and on the pooled features in the first second-level feature set;

obtaining trajectory features that were extracted from the video;

training second classifiers based on the trajectory features;

generating combined classifiers based on the first classifiers and the second classifiers;

obtaining a second video; and classifying the second video using the combined classifiers.

11. The method of claim 10, wherein the pooling is average pooling or max pooling.

12. The method of claim 10, wherein training the first classifiers is further based on the visual features in the frame-level feature sets.

13. One or more computer-readable storage media storing instructions that, when executed by one or more computing devices, cause the one or more computing devices to perform operations comprising:

obtaining frame-level feature sets of visual features that were extracted from respective frames of a video, wherein the respective frame-level feature set of each frame includes the respective visual features that were extracted from the frame;

pooling the visual features from a first group of two or more frame-level feature sets, thereby generating a first lower-pooled-level feature set, wherein the first lower-pooled-level feature set includes pooled features that were aggregated from the respective visual features of different frames, and wherein at least some of the pooled features in the first lower-pooled-level feature set were each generated by pooling two or more visual features into a single pooled feature;

pooling the visual features from a second group of two or more frame-level feature sets, thereby generating a second lower-pooled-level feature set, wherein the second lower-pooled-level feature set includes pooled features that were aggregated from the respective visual features of different frames, and wherein at least some of the pooled features in the second lower-pooled-level feature set were each generated by pooling two or more visual features into a single pooled feature;

pooling the pooled features in the first lower-pooled-level feature set and the second lower-pooled-level feature set, thereby generating a higher-pooled-level feature set, wherein the higher-pooled-level feature set includes pooled features that were aggregated from the pooled features in the first lower-pooled-level feature set and from the pooled features in the second lower-pooled-level feature set, and wherein at least some of the pooled features in the higher-pooled-level feature set were each generated by pooling at least one respective pooled feature from a first lower-pooled-level feature set and at least one respective pooled feature from the second lower-pooled-level feature set into a single pooled feature;

obtaining trajectory features that were extracted from the video;

fusing the trajectory features with one or more of the pooled features in the first lower-pooled-level feature set, the pooled features in the second lower-pooled-level feature set, and the pooled features in the higher-pooled-level feature set, thereby generating fused features;

training classifiers based on the fused features;

obtaining a test video; and classifying the test video using the trained classifiers.

14. The one or more computer-readable storage media of claim 13, wherein the different frames of the first group of two or more frame-level feature sets are temporally adjacent to each other.

15. The one or more computer-readable storage media of claim 13, wherein a number of frame-level feature sets in the first group of two or more frame-level feature sets is different from a number of frame-level feature sets in the second group of two or more frame-level feature sets.

* * * * *